United States Patent [19]

Blanyer

[11] 4,079,323

[45] Mar. 14, 1978

[54] METHOD AND APPARATUS FOR COUPLING A MOVING-OBJECT SENSOR TO DIRECTION-SENSITIVE DATA UTILIZATION APPARATUS

[75] Inventor: Carl G. Blanyer, Thousand Oaks, Calif.

[73] Assignee: Abex Corporation, New York, N.Y.

[21] Appl. No.: 743,533

[22] Filed: Nov. 22, 1976

[51] Int. Cl.² ................. H04B 7/14; G01P 3/66
[52] U.S. Cl. ........................ 328/5; 307/232; 307/308; 324/165; 324/178; 328/109
[58] Field of Search .......... 328/1, 5, 109; 307/308, 307/232; 324/165, 178; 361/236

[56] References Cited

U.S. PATENT DOCUMENTS

| | | | |
|---|---|---|---|
| 3,436,656 | 4/1969 | Brand, Jr. | 324/178 |
| 3,721,859 | 2/1973 | Blanyer | 361/236 |
| 3,721,905 | 3/1973 | Newman et al. | 328/109 |
| 3,750,019 | 7/1973 | Blanyer | 324/178 |

Primary Examiner—Stanley D. Miller, Jr.
Assistant Examiner—B. P. Davis
Attorney, Agent, or Firm—Kinzer, Plyer, Dorn & McEachran

[57] ABSTRACT

An interface logic circuit for supplying direction of passage data to a data utilization apparatus from a moving-object sensor which generates three recognition signals indicative of intrusion of an object into the left end, center, and right end, respectively, of a sensing space adjacent the sensor, comprising directional logic means for generating left-to-right and right-to-left object passage signals in response to the recognition signal sequences left-center-right and right-center-left, respectively, independently of overlap between the recognition signals or duration of the individual signals, and inhibit logic means for inhibiting generation of both object passage signals for all other recognition signal occurrence sequences.

9 Claims, 6 Drawing Figures

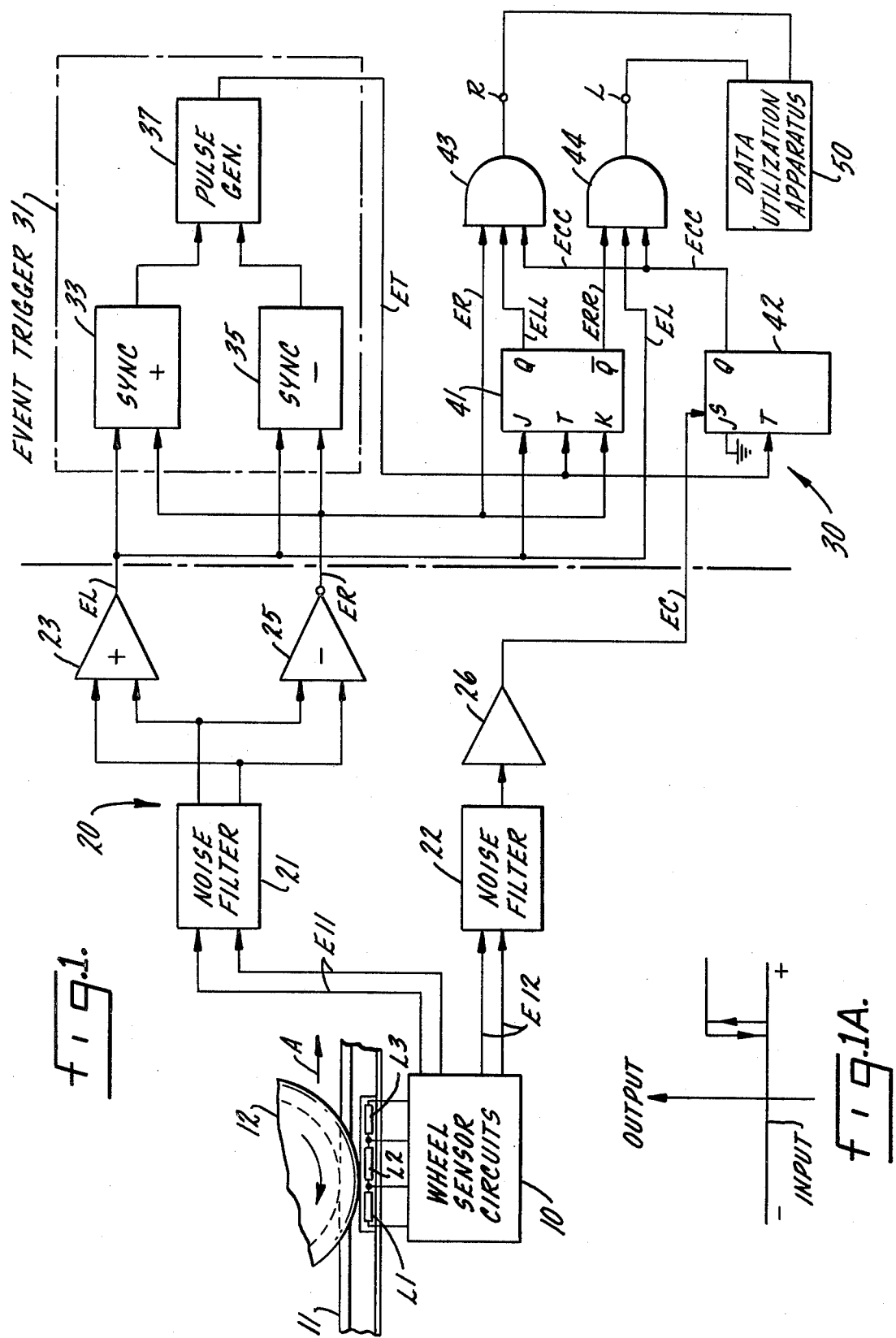

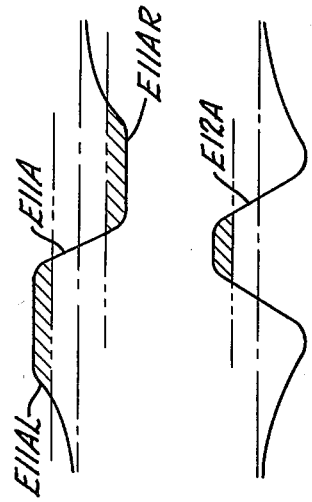
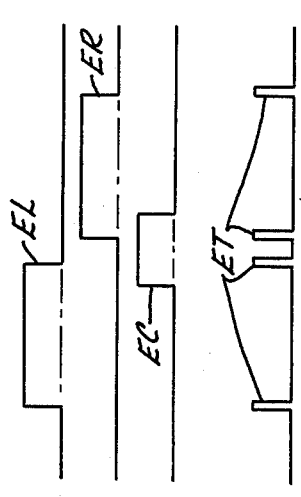
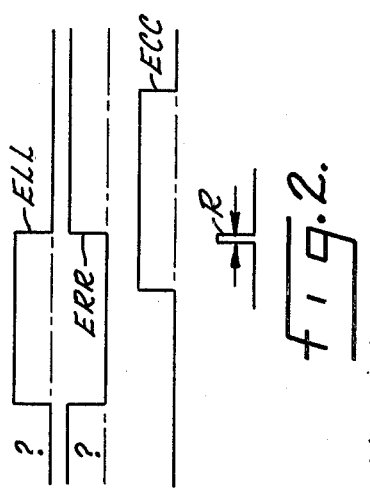
Fig. 2. WHEEL MOVEMENT LEFT TO RIGHT, NORMAL CONDITIONS
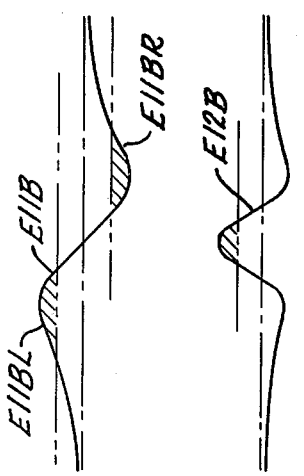
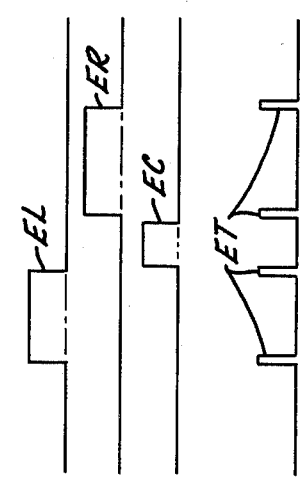
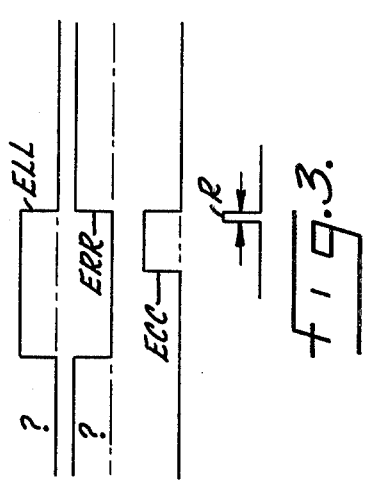
Fig. 3. WHEEL MOVEMENT LEFT TO RIGHT, WEAK SIGNAL CONDITIONS
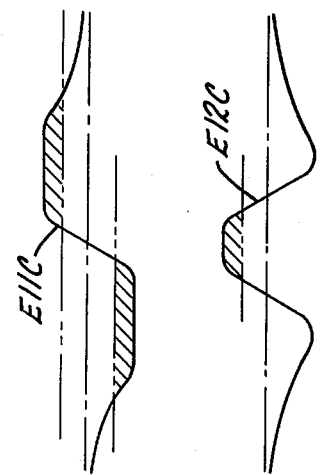
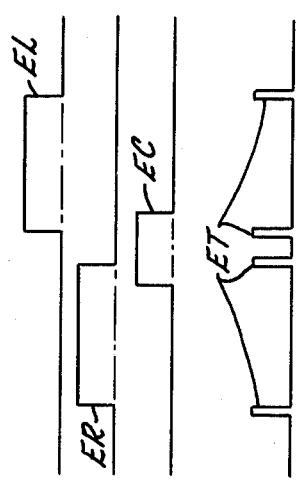
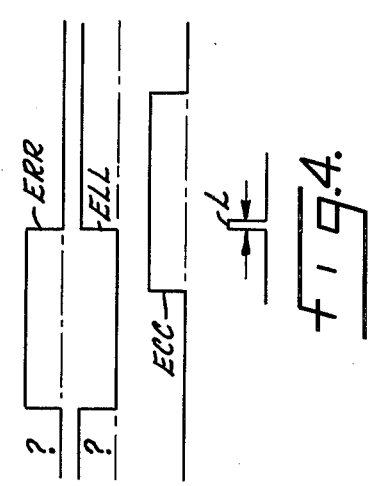
Fig. 4. WHEEL MOVEMENT RIGHT TO LEFT, NORMAL CONDITIONS

METHOD AND APPARATUS FOR COUPLING A MOVING-OBJECT SENSOR TO DIRECTION-SENSITIVE DATA UTILIZATION APPARATUS

CROSS-REFERENCE TO RELATED PATENTS

The method and apparatus of the present invention are particularly adapted to effective utilization of the output signals generated by a moving-object sensor of the kind described and claimed in Blanyer U.S. Pat. No. 3,721,859, although output signals from other sensors could also be used.

BACKGROUND OF THE INVENTION

A moving-object sensor of the kind disclosed in Blanyer U.S. Pat. No. 3,721,859 generates a distinctive group of signals indicative of the movement of a railway wheel or other sensed object into and out of a sensing space or region immediately adjacent to the sensor. These signals are not simple pulses. One of the signals exhibits a substantial excursion of one polarity indicative of intrusion of an object into the sensing space at the left-hand end of the sensor and an excursion of opposite polarity representative of intrusion of an object into the sensing space at the right-hand end of the sensor. These two excursions can be treated separately as individual left-hand and right-hand recognition signals. A third signal in the group produced by the sensor is a center recognition signal representative of intrusion of an object into the center portion of the sensing region adjacent the sensor. Ideally, each of these output signals from the sensor is zero in the absence of an object to be sensed, and each reaches and dwells at a predetermined maximum amplitude during passage of an object through the sensor. In actual service, the at-rest signal values depart from zero to a greater or lesser extent as the result of various non-ideal operational conditions. Furthermore, during the time that an object actually passes through the sensor, any or all of the recognition signals may reach the normal maximum amplitude only very briefly or may even fail to reach that level. Thus, the waveforms of the recognition signals may vary to a great extent.

Waveforms much simpler than those provided by the wheel sensor referred to above would be quite adequate for simple utilization apparatus requiring only information about passage of an object, with no necessity for determining the direction or speed of the object. In many applications, however, it is essential to detect direction as the object moves past the sensor; this is particularly true in railway and other vehicular applications. Effective detection of direction is rather difficult where a broad speed range must be accommodated, particularly if that range extends to zero speed. A complicating factor, again particularly prevalent in vehicular systems, is the possibility, by no means negligible, that the object may stop within the sensing region adjacent a sensor and may then proceed away from the sensor in either its original direction or back in the direction from which it came. A further basic difficulty is that the recognition signals developed by the sensor are often generated in response to movement of different objects (e.g., the several wheels of a railway truck) past the sensor, rather than from the same object, regardless of whether traffic is all proceeding in one direction or is reversing from time to time. Furthermore, time and duration information, relative to the sensor signals, cannot be employed in any simple or trustworthy fashion to unravel this complexity.

A primary requirement in utilization of the output signals from a moving-object sensor or other like sensing device is, of course, discrimination between a true object presence signal and the various drifting and fluctuating signals that may be developed at the sensor outputs even when there is no object present. Thus, a preferred first step in any utilization circuit is the establishment of an operational threshold for each of the recognition signals, so that signal amplitudes below the threshold level are treated as if they had not occurred. In many cases it is sufficient to provide a simple yes-no mode of operation for signals that exceed the threshold amplitude, thus converting the sensor output signals to simple on-off signals.

If signal amplitudes below the threshold are ignored, there is always a "zero signal" interval of finite duration between the left-end and right-end recognition signals developed by the moving-object sensors of U.S. Pat. No. 3,721,859 and similar sensors. The center recognition signal must occur during that zero-signal interval. In many applications, the useful portion of the center recognition signal overlaps each of the left-end and right-end recognition signals in time; two such signal overlaps occur each time an object moves completely through the sensor region. To obtain these overlaps on a consistent basis, however, the operational threshold may have to be made relatively low with respect to the smallest signal peaks developed by the sensor.

The aforementioned overlap between signals has been effectively used to generate object-passage signals that include directional information. A flaw common to all such arrangements is the dependency on relative timing of the center recognition signal with respect to the two end recognition signals. If the operational threshold is raised or the peak amplitude of the output signals from the sensor is lowered, the duration of the overlaps between the center recognition signal and the end recognition signals is reduced; indeed, the probability of the existence of any overlap is also reduced. Thus, a low operational threshold for the recognition signals contributes substantially to security as regards the integrity of directional information. On the other hand, a high operational threshold contributes to security as regards effective discrimination between true object-produced signals and transients or other extraneous signals. Accordingly, those arrangements in which directional data is derived from signal overlap may require a compromise, with respect to the operating threshold, that is rather unsatisfactory and may lead to occasional erroneous interpretation of the output signals by the utilization equipment to which they are supplied. This can be particularly dangerous in vehicular applications in which the output from the moving-object sensor is relied upon to indicate the state of occupancy of a railway track, a section of roadway, a multiple-input conveyor, or the like.

SUMMARY OF THE INVENTION

It is a principal object of the present invention therefore, to provide a new and improved interface logic circuit for coupling a moving-object sensor of the kind described above to a data utilization apparatus, which logic circuit effectively and consistently supplies directional information to the data utilization apparatus for virtually all possible operational conditions of the sensor.

Another object of the present invention is to provide a new and improved method and apparatus for developing left-to-right and right-to-left object passage signals, from left-end, center and right-end recognition signals provided by a moving-object sensor, based solely upon the sequence of occurrence of the recognition signals, independently of the duration of the individual recognition signals and also independently of any overlap between the center recognition signal and either of the end recognition signals.

A specific object of the invention is to provide a new and improved method and apparatus for generating right-to-left and left-to-right object passage signals, based upon the sequence of recognition signals from a moving-object sensor as described above, in which the object passage each comprise a pulse of uniform duration and amplitude suitable for direct use in digital data processing apparatus.

BRIEF DESCRIPTION OF THE DRAWINGS

FIG. 1 is a simplified schematic and block diagram of an interface logic circuit constructed in accordance with the present invention;

FIG. 1A illustrates the operating characteristic of one of the devices incorporated in the circuit of FIG. 1;

FIGS. 2, 3 and 4 illustrate the waveforms for the signals developed and utilized in the circuit of FIG. 1 for different operating conditions.

DESCRIPTION OF THE PREFERRED EMBODIMENT

Figure 5:
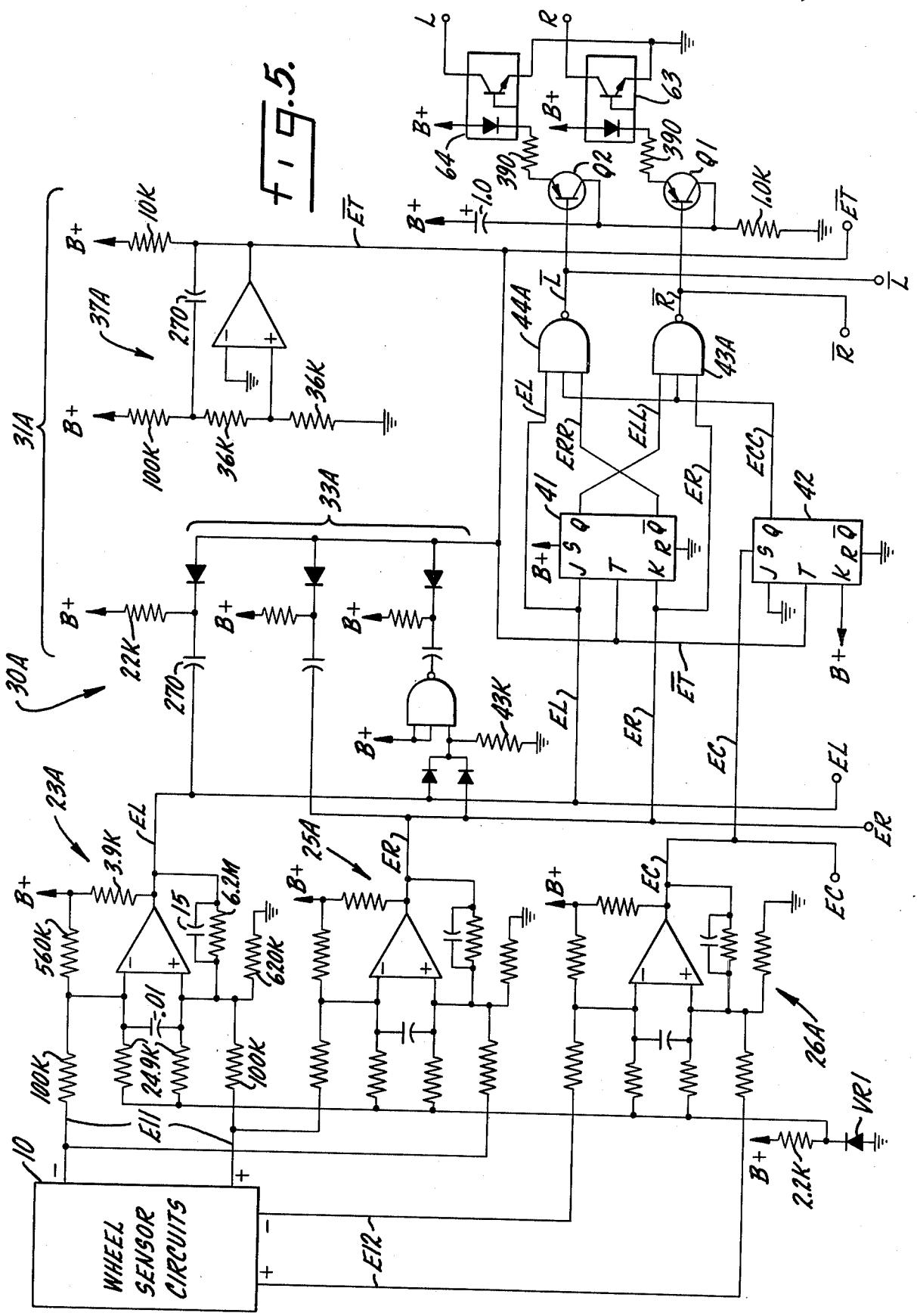
FIG. 5 is a detail circuit diagram of an interface logic circuit constructed in accordance with one embodiment of the invention.

FIG. 1 illustrates an interface logic circuit constructed in accordance with the present invention and employed to couple a moving-object sensor 10 to a data utilization apparatus 50. The moving-object sensor 10 is a railway wheel sensor of the kind described in Blanyer U.S. Pat. No. 3,721,859; it includes three sensing coils L1, L2 and L3 aligned left-to-right along a rail 11. Thus, a railway wheel 12 passing along rail 11, in the direction of the arrow A, first intrudes into the sensing space above coil L1, then into the space above coil L2, and finally into the space above coil L3 as the wheel leaves the sensor. Sensor 10 produces two output signals E11 and E12, the characteristics of those signals being discussed more fully hereinafter in connection with FIGS. 2–4. For the present, it is sufficient to note that signal E11 carries information about the movement of wheel 12 past the end coils L1 and L3 whereas signal E12 affords information regarding movement of the wheel into and out of the space adjacent the center coil L2.

The composite left-right signal E11 from sensor 10 is applied to a noise filter 21, preferably a low-pass filter having a cut-off frequency of about 300Hz. The output of filter 21 is coupled to two threshold amplifier circuits 23 and 25. Amplifiers 23 and 25 may utilize the type of circuits ordinarily used as line receivers in digital data processing systems, including particularly Schmitt trigger circuits. In the illustrates embodiment of the invention, amplifier 23 is responsive to positive-going input signals whereas amplifier 25 is limited in its response to negative-going signals.

The center recognition signal E12 from wheel sensor 10 is applied to another Schmitt trigger or like threshold amplifier circuit 26 through a noise filter 22; filter 22 may again be a low-pass filter. The general operating characteristics for the amplifiers 23, 25 and 26 are shown in FIG. 1A. As illustrated therein, each of these circuit devices provides an output signal that rises immediately to a predetermined maximum value whenever the input signal exceeds a given amplitude with a particular polarity. If the input amplitude drops below the critical threshold, the output voltage falls rapidly to the zero level. A quite limited amount of hysteresis is provided in the operating characteristics for the threshold amplifiers 23, 25 and 26 to preclude hunting or chattering for input signals closely adjacent the operational threshold.

The circuits thus far described comprise an interface unit 20 having three output channels, the outputs of amplifiers 23, 25 and 26. The output signal EL from amplifier 23 is a left-end recognition signal. The output of amplifier 25, the signal ER, is a right-end recognition signal. The output EC of amplifier 26 is a center recognition signal. The interface circuits 20 could be incorporated in the operating circuits of sensor 10; signals EL, EC and ER correspond to the recognition signals shown in FIG. 10C of the aforementioned U.S. Pat. No. 3,721,589.

The left-end recognition signal EL from amplifier 23 is connected to one input of a sync circuit 33 incorporated in an event trigger circuit 31. The ER signal from amplifier 25 is applied to another input of sync circuit 33. Circuit 33 is a high-pass coupling circuit, preferably a differentiating circuit, that produces a sharp spike output signal of brief duration in response to a positive-going input signal. The recognition signals EL and ER are also coupled to the inputs of a second synchronizing circuit 35 that corresponds to circuit 33 except that it is responsive to negative-going signals instead of positive-going signals. The outputs of the two sync circuits 33 and 35 are connected to the two inputs of a pulse generator 37 which develops event trigger signal ET.

Event trigger 31 is a part of a logic circuit 30 that also includes a prior state storage means comprising a flip-flop circuit 41. The J input of flip-flop 41 is connected to the output of interface amplifier 23 and the K input of the flip-flop is connected to the output of amplifier 25. The clock input T of flip-flop 41 is connected to the ET output of pulse generator 37.

Logic circuit 30 further includes a center signal storage means comprising an additional flip-flop 42. The J input of flip-flop 42 is connected to system ground. The clock input T of the flip-flop is connected to the output of pulse generator 37 is event trigger 31. The overriding preset input S of flip-flop 42 is connected to the output of interface amplifier 26.

There are two output circuits for logic circuit 30. The first of these output circuits is an AND gate 43 having three inputs; one input is connected to the output of interface amplifier 25 and a second input is taken from the Q output of flip-flop 41. The third input to gate 43 is connected to the Q output of flip-flop 42.

The second output circuit for logic unit 30 is an AND gate 44 having one input connected to the output of interface amplifier 23 and another derived from the $\overline{Q}$ output of flip-flop 41. The third input to gate 44 is again the Q output of flip-flop 42. The outputs of the two AND gates 43 and 44, constituting a left-to-right object passage signal R and a right-to-left object passage signal L respectively, are supplied to an appropriate data utilization apparatus 50 which may, for example, constitute a zone monitor for determining the state of occupancy of a section of railway track.

Consideration of the operation of logic unit 30 (FIG. 1) can best be understood by reference to the waveform diagrams presented in FIGS. 2, 3 and 4. FIG. 2 illustrates the signals developed in the interface circuits 20 and in logic unit 30 for movement of wheel 12 past sensor 10 from left to right under normal signal conditions. FIG. 3 shows the same signal waveforms for the same wheel movement but under weak signal conditions. FIG. 4 corresponds to FIG. 2 except that the direction of wheel movement is reversed, being opposite to arrow A (FIG. 1).

Referring to FIGS. 1 and 2, as wheel 12 enters the sensing region immediately adjacent wheel sensor 10, and intrudes into the space above coil L1, the output signal E11 first provides a positive-going excursion E11AL as shown in FIG. 2. Subsequently, as the wheel intrudes into the space above the coil L3 while leaving the region adjacent sensor 10, the output signal E11 produces a negative-going excursion E11AR. The overall waveform for normal signal conditions on a left-to-right movement of the wheel past the sensor is represented by the waveform E11A in FIG. 2. During the period in which the wheel passes over the center coil L2, the other output signal E12 affords a positive-going excursion; for normal conditions this is as represented by the waveform E12A in FIG. 2.

The characteristics of the sensor signals E11 and E12 are such that the optimum level for the recognition threshold is approximately one-half the normal maximum signal excursion, as indicated by the shaded portions of the curves E11A and E12A in FIG. 2. Use of this threshold level minimizes the likelihood of false responses to non-zero at-rest conditions or to noise impulses. The operating threshold of one-half the maximum signal excursion for the sensor output signals also minimizes the likelihood of failure to respond sufficiently to a true object intrusion signal. Experience demonstrates that with such an operating threshold operational security is very high.

The first channel in the interface circuits 20 (FIG. 1), comprising filter 21 and threshold amplifier 23, produces an "off" response for an output signal E11 below the threshold and an "on" response above the threshold. Thus, the left-end recognition signal EL constituting the output of amplifier 23 is a signal of uniform amplitude and rectangular waveform having a duration equal to the time that the initial portion E11AL of the sensor signal E11A is above the operating threshold (FIG. 2). The second channel of the interface circuits 20, comprising filter 21 and the inverting threshold amplifier 25, produces a similar right-end recognition signal ER as shown in FIG. 2. The third channel of the interface circuits 20, comprising filter 22 and threshold amplifier 26, produces an output signal EC (FIG. 2) during the time interval that the wheel sensor signal E12 exceeds the operating threshold, as shown by the waveforms E12A and EC in FIG. 2.

Each interface channel is arranged for differential input and each includes a small hysteresis zone (FIG. 1A) to produce a latching effect. The left and right end recognition signals EL and ER respond mutually exclusively to the two polarities of the sensor signal E11. With this arrangement there is a substantial gap between the two end recognition signals EL and ER. Under normal conditions, as shown in FIG. 2, the center recognition signal EC fills this gap with some overlap in time relative to each of the two end recognition signals. However, this condition may not obtain at all times, as shown in FIG. 3. On the other hand, the sequence of signal events illustrated in FIG. 2, with the recognition signals occurring in the sequence EL, EC ER affords a highly reliable indication of direction of passage of wheel 12 past sensor 10.

Event trigger 31 generates a brief standardized pulse at both the leading and trailing edges of both of the end recognition signals EL and ER. Thus, there are four pulses of the trigger signal ET during a normal passage of wheel 12 past sensor 10 (FIG. 1), as shown in FIG. 2. The trigger pulses ET are employed to enable the storage flip-flops 41 and 42 of logic unit 30 to change state in response to the occurrence of specified combinations of events. The joint characteristics of the trigger pulses ET and the storage flip-flops 41 and 42 are such that the flip-flops are each triggered at the end of a pulse ET and hence a brief time after the event that initiated the pulse.

The prior state storage flip-flop 41 is associated with the end recognition signals EL and ER. Except for brief intervals corresponding to the width of the trigger pulses ET, the operational state of flip-flop 41 indicates which of the end recognition signals EL and ER last occurred. The storage signals produced by flip-flop 41, comprising the signal ELL from the Q output of the flip-flop and the signal ERR from the $\bar{Q}$ output are, of course, mutually exclusive. Regardless of which prior end recognition signal is presently stored in flip-flop 41, when a new end recognition signal EL or ER occurs, the flip-flop is driven to the state indicative of the new signal at the end of the trigger pulse ET initiated by occurrence of that signal. It should be noted that during the existence of an event trigger pulse ET, although a new recognition signal EL or ER has been initiated, flip-flop 41 may still store the other end recognition signal. Thus, signals EL and ERR may co-exist during an ET pulse interval and the same is true of signals ER and ELL.

The center signal storage flip-flop 42 stores the center recognition signal EC; signal EC actuates the flip-flop in overriding direct-set manner, not clocked in by one of the trigger pulse ET. Thus, upon initiation of a center recognition signal EC, the ECC output of flip-flop 42 immediately becomes true and remains in that state so long as the EC input signal exists, regardless of the occurrence of additional event trigger pulses ET. Furthermore, flip-flop 42 maintains its true ECC signal after the EC input signal is terminated and until the next event trigger pulse ET occurs; at the trailing edge of that pulse the flip-flop is reset and its output signal ECC goes false.

The two AND gates 43 and 44 generate object passage signals R and L for left-to-right and right-to-left movement of wheel 12 past sensor 10, respectively. A right-going object passage signal R is by no means directly related to the right-hand recognition signal ER, nor is the left-going object passage signal L directly related to the interface signal EL. The relationship is indirect; an R object passage signal results from the co-existence of an ER right-end recognition signal together with stored ELL and ECC signals indicative of prior events. Similarly, the L object passage signal occurs in response to co-existent EL, ECC and ERR signals.

In normal operation, immediately prior to movement of an object into proximity to the sensor, all of the circuits illustrated in FIG. 1 are quiescent, except that flip-flop 41 is necessarily storing one of the two signals ELL and ERR, a heritage from the last wheel passage.

Assuming an object 12 approaches sensor 10 in the direction of arrow A, it first moves over the coil L1 at the left-hand side of the sensor and signal E11 rises above the positive threshold as indicated by the portion E11AL of signal E11A in FIG. 2. This initiates an output signal EL from amplifier 23 and a first event trigger pulse ET is produced by event trigger 31. At the trailing edge of the first event trigger pulse flip-flop 41 changes state to (or remains at) the condition to produce a true output signal ELL as shown in FIG. 2. At some later time, as object movement continues, signal EL is interrupted and a second event trigger pulse ET occurs, but flip-flop 41 continues to store a true output signal ELL. This completes the first of four active stages for logic unit 30 for a normal object (wheel) passage.

Either shortly before, coincident with, or after the interruption of the left-end recognition signal EL, the center recognition signal EC is generated at the output of amplifier 26, indicating the intrusion of the object into the space above the center coil L2 of sensor 10. When this occurs, flip-flop 42 is set to produce a true output ECC. The second stage of operation for logic unit 30 is thus characterized by the joint existence of true levels ELL and ECC.

As the wheel or other object being sensed passes the center of wheel sensor 10 and begins to exit to the right, over coil L3, signal E11 reverses in polarity as indicated by curve E11A in FIG. 2. When the amplitude exceeds the negative threshold level, amplifier 25 produces a right end recognition signal ER (FIG. 2) and another event trigger pulse ET is generated. During the brief time interval that this third ET pulse is present, true signals ER, ELL and ECC co-exist. Accordingly, all of the inputs to AND gate 43 (FIG. 1) are true and an R object passage signal is generated at the output of the AND gate. As shown in FIG. 2, the R signal is an output pulse of predetermined brief duration, the period of the pulse corresponding to the duration of the event trigger pulses ET (FIG. 2).

At the end of that trigger pulse ET, flip-flop 41 is set to its alternate operating state so that the output signal ELL goes false, thus terminating the passage signal R. The left recognition signal EL has terminated well before this, so that there is no possiblity of an erroneous output from gate 44 during this transition. This concludes the third and operationally significant stage of operation for logic unit 30.

As wheel 12 leaves sensor 10, recognition signal ER terminates, producing the fourth trigger pulse ET (FIG. 2). This last event trigger pulse resets flip-flop 42 and its output ECC goes false. This is the final stage of operation for logic unit 30 for a normal left-to-right wheel passage and the apparatus is ready to sense the next wheel passage in either direction.

At typical speeds the sequence of events for a wheel passage, as described above, is completed in a small fraction of a second. However, the time duration of any stage is totally immaterial at any speed below the system maximum. One stage may persist for a minute fraction of a second; another, in a low traffic location, may persist for a week. The net result for any wheel passage is a pulse R or L, having a duration determined by the duration of the event trigger pulse ET, at one output terminal of logic unit 30. This output signal identifies both the event of movement of a wheel or other object past the sensor and the direction of passage. The output pulse (R or L) occurs when the object has passed at least somewhat beyond the center of the sensor.

As noted above, the wheel or other object 12 may stop after entering the zone adjacent the sensor 10. This may happen during the approach to the sensor, before the center recognition signal EC is generated. If the object then retreats back in the direction from which it has approached, the prior state storage flip-flop 41 may be changed in its operational condition, but this produces no output signal from logic unit 30.

In another instance, the wheel may move far enough over sensor 10 so that the center recognition signal EC is initiated. Assuming again a left-to-right passage, the flip-flops 41 and 42 are now set to produce true outputs ELL and ECC, in potential preparation for generation of an object passage signal R. The recognition signals EL and EC may have ceased or may still be present, depending upon the presence or absence of overlap and the progress of the wheel or other object 12. If the object now reverses and returns in the direction from which it came, at least one event trigger pulse ET will occur with the center recognition signal EC no longer present. Consequently, flip-flop 42 is reset and logic unit 30 returns to its quiescent stage. Thus, the wheel intrusion is again ignored and there is no output signal from either of the AND gates 43 or 44.

As a third possibility, extended through three stages, the movement of the object past sensor 10 may continue until a right-end recognition signal ER is generated and an object passage signal R is produced at the output of AND gate 43. That is, the wheel may stop with recognition signal ER still present and with the center signals EC and ECC also still present. The continued presence of the right-end recognition signal ER is all that distinguishes this case from a normal complete passage. If the wheel direction is now reversed, a right-to-left passage takes place, possibly beginning with the second stage of operation for logic unit 30 but otherwise normal, and a right-to-left passage signal L is produced at the output of AND gate 44. It is thus seen that in the first two cases no passage is indicated whereas in the third case two passages of opposite directions are signalled at the outputs of logic unit 30, cancelling each other.

FIG. 3 illustrates the signal conditions occurring in logic unit 30 and in interface circuits 24 for a wheel movement from left to right but with weak signal outputs from sensor 10, as might occur for a wheel displaced outwardly of rail 11 to an unusual extent or a wheel having an unusually shallow flange. As seen by the waveforms of FIG. 3, the operating conditions are essentially the same as for the normal conditions illustrated in FIG. 2 except that there is no overlap between the recognition signals EC, EL and ER and the output signal ECC from the center signal storage flip-flop 42 is terminated at an earlier time, by the third event trigger pulse ET rather than by the fourth such pulse. However, the object passage signal R constituting the output from logic circuit 30 is identical to the passage signal produced under normal conditions; compare FIGS. 2 and 3.

For an object passage from right to left, the same essential operating conditions obtain except that the inputs to AND gate 44 are all true simultaneously, at the time of the third trigger pulse ET, and an output signal L indicative of a left-going object passage is produced instead of a right-going signal R. The signals occurring in the interface circuits 20 and the logic unit 30, for normal signal conditions and for a right to left movement of the detected object, are shown in FIG. 4.

Because at least some electrical noise is frequently present, and because the motion of wheel 12 may be vibratory or irregular, in rare instances the output signals from sensor 10 may rise and fall repeatedly by more than the hysteresis gap (FIG. 1A), causing quickly repeated event triggers or changes of state for the recognition signals, or both. In any circumstances, however, an output passage signal can be developed by logic unit 30 only by evolution from the second stage to the third stage of operation for the logic unit. Only a single passage signal is produced and no other passage can be indicated without substantial movement of the detected object 12. That motion must be sufficient to change the reversing signal E11 from above its threshold at one polarity to beyond its threshold at the other polarity. Thus, noise and irregularities, which reasonably must be expected, do not cause a succession of left and right passage signals L and R, which might be technically correct in a narrow sense but troublesome for any data utilization apparatus 50.

The only situation in which timing might present a potential problem, in the operation of logic unit 30, has a very low probability of occurrence. Assume that a right-going object passage has proceeded to the beginning of the third stage of logic operation so that the right-end recognition signal ER has been initiated, and that an event-trigger pulse ET is still in existence. In principle, the recognition signal ER might terminate before completion of that event trigger pulse ET and before the prior state storage flip-flop 41 has been switched from a true output ELL to a true output ERR, because the change of state in the flip-flop occurs only at the end of the event trigger pulse ET. This improbable sequence of events could cause an abbreviated output passage signal R and could produce a possible confusion in stored signal states.

However, the maximum rate of change of the recognition signals generated by interface circuits 20 is limited by the dynamics of the wheel or other object 12 being sensed, as well as by the filters 21 and 22. The time required for a recognition signal to rise above the threshold, reverse, and accelerate toward a lower value, traversing the hysteresis gap, exceeds the length of the event trigger pulse ET if the latter is judiciously chosen. By limiting the pulses ET to a duration of ten microseconds or less, this potential problem can be eliminated.

The probability of an error of omission (a missed wheel passage) is very small, using the system illustrated in FIG. 1, because it is only necessary that the sensor signals E11 and E12 reach the interface threshold values, and then only briefly, for correct sequencing. The probability of generation of a spurious object passage signal R or L is also quite remote. For a false passage to be indicated in the absence of a real passing wheel, it is necessary not only that three distinct false signals occur, but that they occur in a specific sequence. Thus, logic unit 30 produces an object passage signal R only in response to occurrence of the three recognition signals in the sequence EL, EC, ER. The logic unit further produces a right-to-left object passage signal L only in response to occurrence of the three recognition signals in the sequence ER, EC, EL. Both object passage signals are inhibited for all other sequences of occurrence of the recognition signals. Furthermore, generation of the object passage signals is independent of the duration of the recognition signals and is also independent of any overlap between the center recognition signal EC and either of the end recognition signals EL and ER.

The low likely error rate for logic unit 30 can be demonstrated by considering extraordinary combinations of conditions that would be required to produce an erroneous passage signal. Fundamentally, an erroneous passage signal cannot be developed unless there is an object present to be sensed.

As a first example, it may be assumed that one or more false center recognition signals EC, of full threshold magnitude, occur between successive actual wheel passages. This highly unlikely occurrence would produce a "true" ECC output from flip-flop 42, so that when the next wheel enters the sensing space there is a 50 percent chance that a false object passage signal will be generated, followed in the normal course of events by a correct passage signal. However, only one erroneous passage signal could be generated, even for numerous false center recognition signals.

As a second example, it may be assumed that an oscillating false signal E11 appears at the input to filter 21, from some extraneous source, with a peak-to-peak amplitude exceeding the positive-to-negative threshold span and coincident with a "true" center recognition signal EC. For this remotely possible condition, an alternating succession of false left and right passage signals would be generated. However, such a spurious input must have a large amplitude and also must have a low alternating frequency, below the band limit of filter 21. Thus, a burst of interference of the kind that might reasonably be expected, at substantially higher frequencies, would produce no erroneous signals.

From the foregoing description, it will be apparent that the left-to-right logic in unit 30, specifically the logic circuits supplying input signals to AND gate 43, generates an object passage signal R only in response to the three recognition signals EL, EC and ER when the recognition signals occur in that specific sequence. The right-to-left object passage signal L, on the other hand, developed by the AND gate 44 and its input circuits, appears only in response to occurrence of the three recognition signals in the sequence ER, EC, EL. Generation of false passage signals is effectively inhibited, including those instances in which the sensed object stops at some point within the sensing space, by the provision in logic unit 30 for clearing of the center signal storage device 42 in response to any change of state of either of the end recognition signals EL and ER following termination of the center recognition signal EC. The sources of potential error in logic unit 30 are minimal, virtually to the point of complete elimination, affording much more accurate outputs than previously attainable. Moreover, the standardized passage signal pulses L and R are eminently suitable for direct use in zone monitor and other data processing circuits.

FIG. 5 affords a detailed circuit diagram of an interface logic unit 30A constructed in accordance with a preferred embodiment of the invention. In unit 30A the basic organization and sequence of functions is the same as for circuits 20 and 30 of FIG. 1, but the specific circuit arrangement is somewhat different.

Thus, the interface logic unit 30A includes an input threshold amplifier 23A that also serves as a noise filter, combining the functions of the circuits 21 and 23 of the embodiment of FIG. 1. Similarly, in FIG. 5 a filter and threshold amplifier circuit 25A is incorporated in interface circuit 20A to perform the functions of the combination of circuits 21 and 25 from the previously described embodiment. The input signal to amplifiers 23A and 25A is again the reversing output signal E11 from the wheel sensor circuits 10, and the output signals EL and ER from amplifiers 23A and 25A are end recognition signals that correspond to the similarly designated signals described above.

In the embodiment of FIG. 5, the fixed or center output signal E12 from the wheel sensor circuits 10 is supplied to a threshold amplifier 26A that also functions as a low pass filter and that generates the center recognition signal EC. It is thus seen that the recognition signals ER, EL and EC developed in interface logic unit 30A are the same as described above except that the circuits employed are organized somewhat differently.

Logic unit 30A further comprises an event trigger circuit 31A including a pulse generator 37A connected to a pulse initiating circuit 33A. Circuits 33A includes three individual differentiating circuits and performs the same basic functions as circuits 33 and 35 in the previously described embodiment, responsive to the recognition signals EL, ER and EC supplied thereto. The overall output of the event trigger circuit 31A, in this instance, is the event trigger signal $\overline{ET}$, the inverse of the event trigger signal described above.

The flip-flops 41 and 42 of logic unit 30A correspond fully to the similar circuit elements as described above. The outputs of the flip-flops are combined in two inverting AND gates 43A and 44A to develop left-to-right and right-to-left object passage signals $\overline{R}$ and $\overline{L}$ respectively. The $\overline{R}$ output of gate 43A is also applied to the base of a transistor Q1 to control energization of a light emitting diode incorporated in an optical cell 63. The output of the optical cell 63 is a left-to-right object passage signal R that is completely electrically isolated from the other logic circuits in unit 30A. A similar electrically isolated output for generating the right-to-let object passage signal L is afforded by a transistor Q2 having its base connected to the $\overline{L}$ output of gate 44A and utilized to energize the light emitting diode in an optical cell 64.

FIG. 5 includes the circuit parameters for the individual circuit elements in order to provide a complete and detailed example of a practical working interface logic unit constructed in accordance with the invention. It should be understood that this data is provided solely by way of illustration and in no sense has a limitation on the invention. Because the three filter-threshold amplifiers 23A, 25A and 26A correspond fully in construction to each other, component values are given only in the one amplifier circuit 23A. The same technique is followed with respect to the three differentiating circuits of the synchronizing unit 33A and the two optical cell output coupling circuits. The B+ supply in FIG. 5 is 12 volts. All operational amplifiers are Type 339, all inverting AND gates are Type 4023, the two optical cells are Type 4N37, the flip-flops are Type 4027, the two transistors are Type 2N3906, all diodes in circuit 33A are Type 1N4446, and diode VR1 is Type 1N5235B. The particular circuit illustrated is constructed with CMOS components but it will be recognized that other component types could equally well be employed and that the entire logic unit could also be incorporated in a larger control utilizing a miniprocessor to afford the necessary logical operations.

I claim:

1. An interface logic circuit for coupling a moving-object sensor to a data utilization apparatus requiring direction of passage data, employing a sensor of the kind which generates a left-end recognition signal EL indicative of intrusion of an object into a space at the left end of the sensor, a center recognition signal EC indicative of intrusion of an object into a space at the center of the sensor, and a right-end recognition signal ER indicative of intrusion of an object into a space at the right end of the sensor, comprising:

left-to-right logic means for generating a left-to-right object passage signal R only in response to occurrence of the three recognition signals in the sequence EL,EC,ER;

right-to-left logic means for generating a right-to-left object passage signal L only in response to occurrence of the three recognition signals in the sequence ER,EC,EL;

the two logic means including center signal storage means, common to both logic means, for storing the center recognition signal EC;

and clearing means for clearing the center signal storage means in response to a change of state of either of the end recognition signals EL and ER after termination of the center recognition signal EC.

2. An interface logic circuit for a moving-object sensor, according to claim 1, in which the clearing means comprises:

event trigger circuit means for generating an event trigger signal ET comprising pulses of predetermined duration with an ET pulse occurring at the beginning of each of the end recognition signals EL and ER;

and means for applying the event trigger signal as a clearing signal signal to the center signal storage means.

3. An interface logic circuit for a moving-object sensor, according to claim 2, in which the event trigger circuit means further includes means for generating an ET pulse at the end of each of the end recognition signals ER and EL.

4. An interface logic circuit for a moving-object sensor, according to claim 3, in which the duration of each ET pulse is of the order of ten microseconds or less.

5. An interface logic circuit for a moving object sensor, according to claim 2, comprising a prior state storage means, common to both logic means, for recording which of the end recognition signals EL and ER last occurred, and delay means for delaying recording of either recognition signal in the prior state storage means for a predetermined brief time delay interval following initiation of that recognition signal.

6. An interface logic circuit for a moving object sensor, according to claim 5 in which the delay means comprises the event trigger means, in which the delay interval is equal to the duration of one event trigger signal pulse ET, and in which the delay interval is of the order of ten microseconds or less.

7. An interface logic circuit for a moving-object sensor, according to claim 6, in which the prior state storage means is a bistable storage device developing two alternative output signals ELL and ERR, indicative of last occurrence of recognition signals EL and ER respectively, in which the center signal storage circuit develops an output signal ECC, and in which the left-to-right logic means includes an AND gate responsive to simultaneous application thereto of the signals ELL, ECC, and ER, and the right-to-left logic means includes an AND gate responsive to simultaneous application thereto of the signals ERR, ECC, and EL.

8. An interface logic circuit for a moving-object sensor, according to claim 7, in which the event trigger circuit means further includes means for generating an ET pulse at the end of each of the end recognition signals ER and EL, and in which the duration of each ET pulse is of the order of 10 microseconds or less.

9. A method of generating directional object passage signals for control of a data utilization apparatus, employing the output from a moving-object sensor of the kind which generates a left-end recognition signal EL indicative of intrusion of an object into a space at the left end of the sensor, a center recognition signal EC indicative of intrusion of an object into a space at the center of the sensor, and a right-end recognition signal ER indicative of intrusion of an object into a space at the right end of the sensor, all of the recognition signals being of variable duration, comprising:

generating a left-to-right object passage pulse signal R in response to occurrence of the three recognition signals in the sequence EL, EC, Er, independently of duration of the individual recognition signals and independently of any overlap between the signal EC and either of the signals EL and ER;

generating a right-to-left object passage pulse signal L in response to occurrence of the three recognition signals in the sequence ER,EC,EL, independently of duration of the individual recognition signals and independently of any overlap between the signal EC and either of the signals EL and ER;

and inhibiting generation of both object passage signals for all other sequences of occurrence of the recognition signals by storing the center recognition signal EC, in preparation or generation of a passage pulse signal, and clearing the stored center recognition signal upon initiation of either of the end recognition signals ER and EL following termination of the center recognition signal EC.

* * * * *